United States Patent
Proksch et al.

(10) Patent No.: US 7,266,997 B2
(45) Date of Patent: Sep. 11, 2007

(54) TACTILE FORCE AND/OR POSITION FEEDBACK FOR CANTILEVER-BASED FORCE MEASUREMENT INSTRUMENTS

(75) Inventors: Roger Proksch, Santa Barbara, CA (US); Jason Cleveland, Ventura, CA (US); Dan Bocek, Goleta, CA (US); Todd Day, Goleta, CA (US)

(73) Assignee: Asylum Research Corporation, Santa Barbara, CA (US)

( * ) Notice: Subject to any disclaimer, the term of this patent is extended or adjusted under 35 U.S.C. 154(b) by 15 days.

(21) Appl. No.: 10/288,877

(22) Filed: Feb. 11, 2003

(65) Prior Publication Data

US 2004/0000189 A1    Jan. 1, 2004

(51) Int. Cl.
*G01B 5/28* (2006.01)
(52) U.S. Cl. ....................................... 73/105
(58) Field of Classification Search .................. 73/105, 73/1.08, 1.09, 1.11, 862.52; 250/306, 307
See application file for complete search history.

(56) References Cited

U.S. PATENT DOCUMENTS 5,802,353 A * 9/1998 Avila et al. .................. 395/500

6,452,174 B1 * 9/2002 Hirose et al. ............... 250/309

OTHER PUBLICATIONS

Guthold, M., et al., "Controlled Manipulation of Molecular Samples with the nanoManipulator", *IEEE Transactions on Mechatronics*, 2000, vol. 5, pp. 189-198.
Sitti, Metin, et al., "Tele-Nanorobotics Using Atomic Force Microscope", *Proc. of IEEE/RSJ IROS '98 Conference*, Oct. 1998, pp. 1739-1746.
Sitti, Metin, et al., "Teleoperated Nano Scale Object Manipulation", article for *Recent Advances on Mechatronics*, Springer Verlag Pub., May 1999.
Sitti, Metin, et al., "Teleoperated Touch Feedback from the Surfaces at the Nanoscale: Modelling and Experiments", *IEEE/ASME Transactions on Mechatronics*, Mar. 2003, vol. 8, No. 1, pp. 1-12.

* cited by examiner

*Primary Examiner*—Robert Raevis
(74) *Attorney, Agent, or Firm*—Morgan, Lewis & Bockius LLP

(57) ABSTRACT

An apparatus for simulating a tactile interface with the relative position of the probe of a cantilever-based force measurement instrument, such as an atomic force microscope, molecular force probe or profilometer, or the force between the probe and a sample. The device can be easily incorporated into existing control electronics for such instruments or can be incorporated into a relatively small and simple hand-held device to be used with such instruments.

12 Claims, 1 Drawing Sheet

TACTILE FORCE AND/OR POSITION FEEDBACK FOR CANTILEVER-BASED FORCE MEASUREMENT INSTRUMENTS

CROSS-REFERENCE TO RELATED APPLICATIONS

This application claims priority of U.S. Provisional Application No. 60/332,650, filed on Nov. 5, 2001, the disclosures of which are incorporated fully herein by reference.

REFERENCES CITED

Other Publications

Sitti, M. and Hashimoto, H., Tele-nanorobotics using an atomic force microscope as a nanorobot and sensor, Advanced Robotics, 1999, vol. 13 (no. 4), pp. 417-36.

Guthold, M., Falvo, M. R., Matthews, W. G., Paulson, S. and others, Controlled manipulation of molecular samples with the nanomanipulator, 1999 IEEE/ASME International Conference on Advanced Intelligent Mechatronics (Cat. No. 99TH8399).

Sitti, M. and Hashimoto, H., Tele-nanorobotics using atomic force microscope, Proceedings, 1998 IEEE/RSJ International Conference on Intelligent Robots and Systems. Innovations in Theory, Practice and Applications (Cat. No. 98CH36190). (Victoria, BC, Canada, 13-17 Oct. 1998). New York, N.Y., IEEE, 1998, pp. 1739-46 vol. 3.

Sato, T., Ichikawa, J., Mitsuishi, M., Miyazaki, H. and others, Micro-teleoperation with manual task execution posture, IEEE Control Systems Magazine, February 1995, vol. 15, (no. 1), pp. 22-9.

BACKGROUND AND SUMMARY OF THE INVENTION

The present invention relates generally to devices that provide a tactile interface with the relative position of the probe of a cantilever-based force measurement instrument, such as an atomic force microscope, molecular force probe or profilometer, or the force between the probe and a sample.

Cantilever-based force measurement instruments are now commonly used to make measurements with micro-newton to pico-newton resolution on a variety of samples, including single molecules. In many cases it is advantageous to provide feedback to the operator as to the relative position of the probe of the cantilever or the force between the probe and the sample. This has been accomplished a number of ways, including the use of visual and audio signals.

It has also been accomplished through tactile feedback where a force or torque is applied to a control mechanism that is related to another signal, such as the deflection of the cantilever probe. There are a number of such haptic devices that already exist for the control of cantilever-based force measurement instruments including a joystick developed by Hermann Gaub of the University of Munich and a joystick based on commercially available force feedback joysticks developed at MDT-NT, a Russian nanotechnology company. The three-dimensional haptic interface marketed by 3rd Tech in North Carolina goes even further by extending the force feedback to three dimensions.

It is desirable to have a tactile feedback device that is simple and that could be easily incorporated into existing control electronics or that could be incorporated into a relatively small and simple hand-held device. We have developed a force feedback knob. In this device, a parameter, such as the voltage applied by the instrument's piezo or the setpoint or desired position of the instrument's closed loop positioner, is varied by rotating the knob. A variable torque is applied to the knob to provide tactile feedback to the operator regarding the value of an appropriate parameter, such as the deflection of the cantilever probe.

DESCRIPTION OF THE PREFERRED EMBODIMENTS

Figure 1:
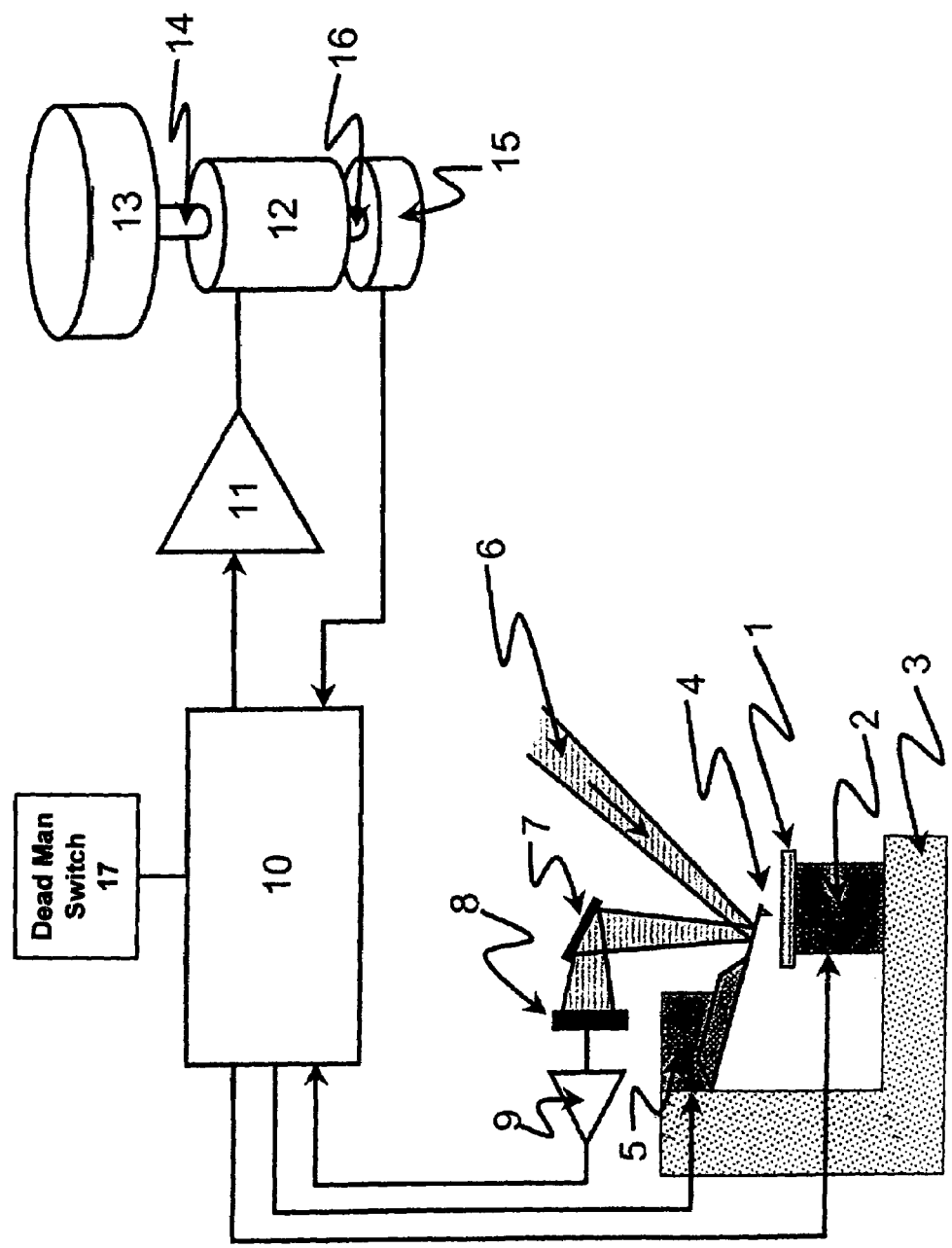
FIG. 1: A preferred embodiment of tactile knob according to the invention.

FIG. 1 shows a tactile knob according to the invention disclosed herein. In this embodiment, the sample 1 is supported by a holder 2 which can be fixed in the frame 3 of the instrument, or (not shown) could include an actuator that moves the sample in the z-axis, an actuator that translates the sample in one or both of the x- and y-axes or an actuator providing full three-dimensional translation, depending on the type of cantilever-based force measurement instrument that employs the invention. The cantilever 4 is held by the cantilever holder 5 that is attached to the frame 3 of the microscope. Like the sample holder 2, the cantilever holder 5 can optionally move along a variety of axes, again depending on the type of cantilever-based force measurement instrument that employs the invention. If the cantilever holder 5 or the sample holder 2 includes actuators, two preferred embodiments are that they are either piezo tube actuators or flexured piezo scanners. In the embodiment shown in FIG. 1, the cantilever motion is detected optically. A light beam 6 is directed onto the back of the cantilever 4. The beam successively reflects onto a positioning mirror 7 and then onto a position sensitive detector 8. To anyone skilled in the art, it is clear that the position sensor 8 could take a variety of forms, including a segmented photodiode, a linear position sensitive detector or a video camera. The signal from the position sensitive detector 8 can be conditioned by appropriate amplification, offset and filtering electronics 9 before it is sent to the controller 10. The controller 10 can use the signal from the position sensitive detector 8 to modify the position of the sample holder 2 or the cantilever holder 5. In the preferred embodiment shown in FIG. 1, the controller uses analog to digital converters (not shown) to read information in and uses digital to analog converters (not shown) to output control voltages.

The controller is also used to drive a motor 12 that applies a torque to a knob 13. It is advantageous to drive the motor 12 with a high power amplifier 11. The torque applied to the knob 13 by the motor 12 can be coupled to the knob 13 in various ways. In the preferred embodiment shown in FIG. 1, the motor 12 can be directly coupled to the knob 13 through shaft 14. The magnitude and direction of the torque that the motor 12 applies to the knob 13 could be electronically controlled. Additional control can also be obtained by replacing shaft 14 with a clutch (not shown), including mechanical, electrical or magnetic clutches. Electrically controlled clutches have the advantage of allowing the motor 12 to be engaged or disengaged from the knob 13 using either software programmable criteria or operator input. In the preferred embodiment shown in FIG. 1, a position (rotary) encoder 15 is coupled to the motor 12 and knob 13 through a coupling 16. This allows rotational position of the knob 13 and motor 12 to be measured and the measurements can be used in the feedback signal. In particular, the rotational position can be used to control the sample position. For typical single molecule force measurements, the encoder 15 controls the z-separation of the sample and cantilever tip while the torque exerted by the motor 12 on the knob 13 is related to the vertical deflection signal from the position sensitive detector 8.

Typically, the dynamic range of a force or position transducer, such as the invention disclosed herein, will be limited. At the low end, no mechanical interface can be manufactured with perfect mechanical tolerances. Knobs and other mechanical interfaces with human beings always have some imperfections and friction in the mechanism that limits the smallest perceptible motion or force. At the high end, there is a limit to the amount of force that a human hand will tolerate. The difference between these two values defines the dynamic range of the mechanical interface. It is, however, possible to enhance the perception range by processing the feedback signal. Examples of such processing that might prove useful in the invention disclosed herein include thresholding the torque values applied to the knob 13 by the motor 12, thereby assigning all feedback signals larger or smaller than certain magnitudes with the same torque values or applying a torque value that is proportional to the logarithm of the feedback signal. Both these examples would have the effect of increasing the dynamic range of operation perception. With some force measurements, we are concerned with sudden, discontinuous events (such as when a chemical bond ruptures or a protein suddenly unfolds). In this situation, it may be advisable to have a feedback torque signal that is a function of the velocity of the force probe.

If the knob in the invention disclosed herein is made software controllable, the force feedback mechanism can be engaged or disengaged by software programmable criteria or the choice of the user. One example of software programmable criteria is a dead-man switch 17. A physical dead-man switch operates in the following manner: when the user makes contact with the switch, the feedback loop is operational and when the user is not in contact with the switch, the feedback loop is turned off. This switch could be a touch switch not requiring any mechanical action. A "virtual" dead-man switch can also be implemented. This embodiment relies on the motion of the knob being deterministic when the operator is not in contact with the knob. When the operator is in contact with the knob, the motion will in general differ from this deterministic motion. Thus, by comparing the deterministic motion with the actual motion it is possible for the software to determine if the operator is in contact with the knob. If the operator is not in contact, the software can disengage the feedback loop. Similarly, when the operator again makes contact with the tactile interface, it will once again begin to behave in a non-deterministic manner. This behavior will allow the control system to once again engage the force feedback.

In some situations the tactile interface may use a motor with a high gear ratio. In this situation, it is more difficult for the operator to operate the interface with the geared mechanical disadvantage. In this case, it is possible for the motor to be operated in a "power steering" mode, where the motor is actually used to provide assistance to the operator by providing a mechanical advantage.

The described embodiments of the invention are only considered to be preferred and illustrative of the inventive concept. The scope of the invention is not to be restricted to such embodiments. Various and numerous other arrangements may be devised by one skilled in the art without departing from the spirit and scope of the invention.

What is claimed is:

1. A cantilever-based force measurement instrument, comprising:
   a cantilever probe;
   a device providing feedback to an operator of the instrument as to the relative position of the cantilever probe, the device comprising:
      a rotatable knob;
      means by which an operator-induced change in the position of the knob varies a performance parameter of the instrument; and
      means by which a torque is applied to the knob that is a function of another performance parameter of the instrument.

2. The cantilever-based force measurement instrument of claim 1, wherein the instrument is an atomic force microscope.

3. The cantilever-based force measurement instrument of claim 1, wherein the instrument measures a force between the cantilever probe and a single molecule of a sample.

4. The cantilever-based force measurement instrument of claim 1, wherein the means by which torque is applied to the knob includes a motor coupled to the knob, and instrument includes a controller coupled to the motor to control the torque applied to the knob by the motor.

5. The cantilever-based force measurement instrument of claim 1, wherein the performance parameter of the instrument that is varied by the operator-induced change in the position of the knob is a separation of the sample and cantilever probe in a predefined z direction.

6. The cantilever-based force measurement instrument of claim 1, wherein the other performance parameter of the instrument is deflection of the cantilever probe.

7. A cantilever-based force measurement instrument, comprising:
   a cantilever probe;
   a device providing feedback to the instrument operator as to the force between the cantilever probe and a sample, the device comprising:
      a rotatable knob;
      means by which an operator-induced change in the position of the knob varies a performance parameter of the instrument; and
      means by which a torque is applied to the knob that is a function of another performance parameter of the instrument.

8. The cantilever-based force measurement instrument of claim 7, wherein the instrument is an atomic force microscope.

9. The cantilever-based force measurement instrument of claim 7, wherein the instrument measures a force between the cantilever probe and a single molecule of a sample.

10. The cantilever-based force measurement instrument of claim 7, wherein the means by which torque is applied to the knob includes a motor coupled to the knob, and instrument includes a controller coupled to the motor to control the torque applied to the knob by the motor.

11. The cantilever-based force measurement instrument of claim 7, wherein the performance parameter of the instrument that is varied by the operator-induced change in the position of the knob is a separation of the sample and cantilever probe in a predefined z direction.

12. The cantilever-based force measurement instrument of claim 7, wherein the other performance parameter of the instrument is deflection of the cantilever probe.

* * * * *